Patented July 15, 1952

2,603,655

UNITED STATES PATENT OFFICE 2,603,655

BUTADIENE-ALKYLBENZENE-OLEFIN CONDENSATION PRODUCTS AND METHOD FOR THEIR PRODUCTION

Daniel E. Strain, Wilmington, Del., assignor to E. I. du Pont de Nemours and Company, Wilmington, Del., a corporation of Delaware No Drawing. Application September 20, 1949, Serial No. 116,864

8 Claims. (Cl. 260—486)

This invention relates to modified products from 1,3-butadiene, an alkyl substituted aromatic hydrocarbon and a polymerizable organic compound and is more particularly directed to the condensation products of 1,3-butadiene and xylene chemically combined with a polymerizable organic compound and processes of preparing them.

Condensation products have been made from 1,3-butadiene and cyclic hydrocarbons having at least one aromatic nucleus and no olefinic side chains (Hoffman et al. U. S. Patent 1,934,123). In the copending application of D. E. Strain and W. F. Gresham, S. N. 15,958, filed March 19, 1948, are described oil like products which are produced by condensing 1,3-butadiene with alkyl substituted benzenes and more especially with xylene, there being present in the resulting product from 1 to 13 or more butadiene groups per mole of the alkyl substituted benzene. The invention of this case is directed to such condensation products and related condensation products that have been chemically modified.

An object of the present invention is to provide chemically modified products from 1,3-butadiene and an alkyl substituted benzene reaction product. Another object of the invention is to provide copolymers from condensation products of 1,3-butadiene and an alkyl substituted hydrocarbon, such as benzene, with polymerizable organic compounds. Yet another object is to provide new compositions of matter comprising the reaction products of a polymerizable organic compound containing monoolefinic unsaturation with the condensation product of 1,3-butadiene and xylene. Other objects and advantages of the invention will hereinafter appear.

The invention is particularly directed to the second step of a two-step process. In the first step, a condensation product is prepared from 1,3-butadiene and an alkyl substituted benzene. In the second step the condensation product of the first step is copolymerized with a polymerizable organic compound. The product of the first step, which may be produced in accord with the process of the aforesaid Strain and Gresham application, or by any other suitable process, is charged into a receptacle preferably fitted with a reflux condenser and to this product the polymerizable organic compound is added with or without a polymerization catalyst. Polymerization is effected on standing but preferably by heating the solution. The copolymers resulting from this reaction may be used directly as produced without further purification or may be purified by vacuum topping to remove unreacted monomer and low-boiling polymers. The resulting copolymers have many valuable inherent properties which particularly fit them for use in the varnish, paint, lacquer and allied fields as resinous adjuvants, linseed oil substitutes and bodying agents.

The first step of the process may be conducted in accord with the details disclosed in the copending application S. N. 15,958 supra in accord with which process 1,3-butadiene and an alkyl substituted benzene, such, for example, as toluene, ethyl benzene, diethyl benzene, triethyl benzene, propyl benzene, isopropyl benzene, secondary butyl benzenes, and higher alkyl substituted benzenes are brought together in a closed autoclave and in the presence of sodium or other alkali metal as the catalyst. The sodium is dispersed throughout the reaction mixture in a finely divided form, and the mixture heated under a pressure between 3 and 20 atmospheres, at a temperature ranging between 75 and 225° C. Under these conditions a condensation between the 1,3-butadiene and the alkyl substituted benzene occurs, the catalyst is removed by neutralization with a suitable organic acid such as acetic or propionic acid or washed from the reaction product with water and the condensation product separated from the unconverted reactants by distillation.

The product of the first step is then subjected to copolymerization with a polymerizable organic compound, this copolymerization being conducted in the presence or absence of a polymerization catalyst under a temperature between 60 and 250° C. Generally no catalyst is required, the copolymerization reaction being conducted by heating the mixture of the 1,3-butadiene-alkyl substituted benzene with the monomeric polymerizable organic compound at a temperature between 150 and 200° C. Alternatively, the monomeric compound containing a polymerization catalyst is added over a period of time to the condensation product while maintaining the reaction mixture at polymerization temperatures. The polymerization is allowed to proceed until the desired degree of modification of the condensation product is attained. Valuable products are produced by continuing the polymerization to a viscosity between 4000 and 200,000 cp. at 25° C. or higher. The 1,3-butadiene-alkyl substituted aromatic hydrocarbon may be prepared by this or any other suitable process.

Equal weights of butadiene and xylene or other alkyl substituted hydrocarbon is reacted continuously in the presence of 1% (based on butadiene) of finely-dispersed sodium at 100° C. and 250 p. s. i. pressure. After the sodium catalyst has been removed by water washing the synthesis product is flashed at 10 mm. and a temperature of about 170° C. for the xylene removal. The flasher distillate is redistilled in a Fenske column to remove unreacted xylene and pure cuts of low molecular weight oils. Three flat cuts above xylene may be obtained. Illustrative of the refined products obtainable from the crude butadiene-xylene oil are the four products listed in Table I. Sample "A" is a purified cut which consists principally of dimers resulting from the addition of one mole of butadiene to one mole of xylene (O-, m-, p-xylene and ethyl benzene; sample "B" similarly illustrates trimers, sample "C" tetramers of respectively 2:1 and 3:1, moles of butadiene per mole of xylene. Sample "D" consists of a mixture of reaction products averaging between 5 and 7 moles of butadiene per mole of xylene. Iodine number (standard Wijs procedure), refractive index, specific gravity and other pertinent properties of the products are shown. The theoretical iodine number and the theoretical molecular weight values are calculated on the basis of a butadiene-xylene addition product.

TABLE I

*Reaction products of butadiene and xylene*

| Sample Code | A | B | C | D |
|---|---|---|---|---|
| Approx. Mole ratio butadiene : xylene | 1:1 | 2:1 | 3:1 | Av. 5-7. |
| Boiling range, °C./mm. Hg | 146–151/100 | 140–150/10 | 130/1 | |
| Approx. boiling point, 760 mm | 222 | 280 | | |
| Iodine number, experimental | 173 | 239 | 287 | 320–380. |
| Theoretical iodine number | 159 | 235 | 284 | 336–368. |
| Refractive Index $N_r^{25}$ | 1.5045 | 1.5092 | 1.5072 | ca 1.5120. |
| Specific gravity 60° F./60° F | 0.886 | 0.890 | 0.890 | ca 0.900. |
| Viscosity, cp., 25° C | | ca 1 | | 20–1200. |
| Samples heat-bodied 8 hrs./300° C.: | | | | |
| Iodine number | | 164 | | less than 50. |
| Refractive index, $N_D^{25}$ | | 1.5302 | | greater than 1.54. |
| Specific gravity, 60° F./60° F | | 0.939 | | greater than 0.95. |
| Viscosity, cp., 25° C | | 22 | | gels. |

The invention is illustrated by the examples which follow and in which parts are by weight as they are in the process of the first step unless otherwise indicated:

EXAMPLE 1

150 parts product D of Table I
90 parts butyl methacrylate (0.63 mols)
1 part benzoyl peroxide A selected product D from Table I was heated at a temperature between 130 and 137° C. in a 1-liter, 3-neck flask fitted with a reflux condenser, stirrer and thermometer. The benzoyl peroxide was dissolved in the butyl methacrylate and the solution was added dropwise through the reflux condenser. The addition of butyl methacrylate required approximately 2 hours and the charge was then allowed to cool slowly to room temperature. The product obtained was a clear, red liquid having a viscosity of 6300 cp. at 25° C. The viscosity of the original condensation product was approximately 500 cp. at 25° C. By the addition of 0.16% mixed lead, manganese and cobalt drier this original condensation product formed on standing at room temperature and in 16 hours a clear, air dried film having a pencil hardness of 7B. The butadiene-xylene/butyl methacrylate copolymer with the same amount of drier, air dried in 16 hours to a clear film having a pencil hardness of 5B. In contrast to the copolymer, a blend of condensation product D with preformed polymeric butyl methacrylate gave an opalescent film on air drying.

EXAMPLE 2

270 parts oil D from Table I
98 parts styrene (0.94 mols)
0.8 part benzoyl peroxide In all material details the process of Example 1 was followed in producing the copolymer of this example. The charge was heated at 134 to 145° C. for 2 hours and 25 minutes during which all of the styrene-benzoyl peroxide mixture was added. The temperature was then gradually increased to 200° C. over a period of 50 minutes and the product then allowed to cool slowly. The product was a red, opalescent liquid with a viscosity of 32,000 cp. at 25° C. With the addition of 0.16% of mixed drier a clear air dried film was formed in 16 hours having a pencil hardness of 2B. The iodine number of the selected D oil was 356 and the molecular weight was 611 as determined by the boiling point procedure. The iodine number of the copolymer product was 280 and the molecular weight was 842.

EXAMPLE 3

612 parts oil D of Table I
212 parts nonyl methacrylate (1 mol)
10.9 parts glycerine (0.13 mol)

The materials listed above were charged to a 2-liter flask and heated at a temperature between 200 and 230° C. for 2 hours. An orange colored opalescent liquid was formed which had a viscosity of 9000 cp. at 25° C. The product with 0.16% of mixed drier dried to a film hardness of 7B in 19 hours and to film hardness of 2B in 40 hours.

EXAMPLE 4

306 parts oil D from Table I
50 parts methyl methacrylate (containing inhibitor)

The materials were added to a 1-liter flask fitted with a stirrer and reflux condenser and heated to a temperature between 148 and 170° C. for about 7 hours during which there was very litle reflux. The product was a brown colored, opalescent liquid having a viscosity of 4500 cp. at 25° C. With 0.16% of mixed drier this material dried to a pencil hardness of 5B in 24 hours.

EXAMPLE 5

600 parts oil D from Table I
50 parts maleic anhydride (0.5 mol)
50 parts toluene The selected oil D from Table I used in this example had an iodine number of 356, a molecular weight of 573 and a viscosity of 600 cp. at 25° C. The materials were charged to a flask fitted with a reflux condenser and a stirrer. The charge was heated to a temperature between 135 and 184° C. for 1½ hours and cooled rapidly. The product was a light yellow colored liquid having a viscosity of 35,000 cp. at 25° C. With 0.16% of mixed drier this material gave a clear film which air dried to a pencil hardness of 7B in 16 hours.

EXAMPLE 6

600 parts oil D from Table I
156 parts m-butanol (2.05 mols)
98 parts maleic anhydride (1.0 mol)

The butanol and maleic acid were reacted until an acid number of 64.5 was obtained and then the oil D was added. Thereafter the mixture was heated between 210 and 230° C. for about 45 minutes. During the esterification of the butanol with the maleic anhydride and during the subsequent reaction with oil D, water and some butanol distilled off. Based on the recovered butanol the mole composition of the product was calculated to be 1:1:0.85-oil D : maleic anhydride : butanol. The viscosity of the product was greater than 1000 poises at 25° C. and the acid number was 6.4. With 0.16% of mixed drier the hardness of an air dried film after 16 hours was 7B and after 2½ months 7H. Unmodified oil D dries to a hardness of greater than 9H in 5 days.

EXAMPLE 7

400 parts oil D from Table I
400 parts lauryl methacrylate (1.6 mols)

The oil D of Table I used in this example had an iodine number of 359, a molecular weight of 638 and a viscosity of 500 cp. at 25° C. The charge was heated at 190 to 220° C. for 3 hours. The product had a viscosity of 30,000 cp. at 25° C. and an iodine number of 153. By the addition of 0.16% of mixed drier, an air dried film was prepared. The hardness of this film was 1H after 6 weeks and 1H after 10 weeks.

EXAMPLE 8

450 parts oil D from Table I (ca. 0.8 mol)
150 parts dicyclopentadiene (1.1 mols)

The condensation product similar to that shown as oil D used in this example had a true iodine number of 347, a molecular weight of 557, a viscosity of 500 cp. and a refractive index value of 1.5227. The charge was refluxed at an increasing temperature starting at 175° C. After 7 hours the temperature had reached 230° C. and refluxing had substantially stopped. The charge was then held at 230° C. for an hour and subsequently allowed to cool. The product had a viscosity of 32,000 cp. and the refractive index was 1.5372. A film prepared from this material and 0.16% of mixed metal driers air dried in 18 hours to a pencil hardness of 4H.

Pencil hardness is the hardest lead which on applying at a pressure sufficient to crumble the lead does not scratch the film.

Not only can the condensation product of the first step be copolymerized with the organic compounds described in the examples but also these condensation products of the first step may be copolymerized with vinyl acetals, vinyl chloride, vinylidene chloride, vinyl alcohol, styrene, vinyl acetate, methacrylic acid esters (such, for example, as methyl, ethyl, propyl, butyl and higher aliphatic alcohol esters of methacrylic acid), acrylic acid esters (such, for example, as methyl, ethyl, propyl, butyl and higher molecular weight alkyl esters of acrylic acid), phenol formaldehyde, melamine formaldehyde, urea formaldehyde, isobutylene, isomerized rubber, coumarin indene resins, polyamides, and, in fact, any aliphatic, aromatic or aliphatic aromatic polymerizable organic compound containing monoolefinic unsaturation. Dienes and other polymerizable polyunsaturated compounds, other than 1,3-butadiene, may likewise be copolymerized with the 1,3-butadiene alkyl substituted aromatic hydrocarbon condensation products, examples of such compounds are isoprene, butene, dimethylbutadiene, and the like.

Generally speaking the copolymerization reaction may be conducted at temperatures between 50 and 300° C. and preferably at temperatures between 150 and 200° C. Pressures may be used if desired although the reaction is preferably conducted at atmospheric pressures.

The ratio of condensation products to the polymerizable unsaturated organic compounds may be varied through wide limits, excellent products, however, being prepared with from 0.1 to 10 parts by weight of the condensation product per part of the polymerizable organic compound.

Catalysts generally are employed to speed up the polymerization reaction, although the reaction will go without a catalyst, and for this purpose peroxygen catalysts are recommended such, for example, as benzoyl peroxide, trichloroacetyl peroxide, diisopropyl dicarbonate, the dialkyl peroxides such as dimethyl, diethyl, dipropyl and the higher dialkyl peroxides as well as the azo catalysts and particularly those that contain acyclic azo —N=N— such as are described in the Hunt Patent 2,471,959 of May 31, 1949.

The examples illustrate the preparation of copolymers particularly with selected oil D products of Table I. Similar products having a wide range of properties can be prepared from 1,3-butadiene-xylene condensation products having the proportion of 1,3-butadiene to xylene of oils A, B or C of Table I or from the oils produced by the process of the Strain et al. disclosure having other ranges for these reactants and from the other condensation products of 1,3-butadiene and other alkyl substituted aromatic hydrocarbons of those inventors.

The products produced in accord with the process of this application may be used in varnish, paint, lacquer, and coating compositions generally, as well as in the production of inks, core oils, linoleum and the like, the copolymers being compounded in a manner similar to linseed oil and like drying oils, and may likewise be used in part as replacement of synthetic resins, as the products of this invention are capable, on the one hand, of drying by the absorption of oxygen, and on the other, of resinifying by thermal treatment.

I claim:

1. A copolymer of a polymerizable organic compound of the group consisting of mono and diolefinic unsaturated compounds, other than 1,3-butadiene, and a 1,3-butadiene alkyl substituted benzene condensation product, the condensation product having been prepared by heating 1,3-butadiene with an alkyl substituted benzene in the presence of an alkali metal.

2. A process for the preparation of a copolymer of claim 1 which comprises heating together, in the presence of a polymerization catalyst and at temperatures between 50 and 300° C., a compound of the group consisting of mono and diolefinic unsaturated compounds, other than 1,3-butadiene, and a 1,3-butadiene alkyl substituted benzene condensation product prepared by heating 1,3-butadiene with an alkyl substituted benzene in the presence of an alkali metal.

3. A copolymer of a polymerizable organic compound of the group consisting of mono and diolefinic unsaturated compounds, other than 1,3-butadiene, and a 1,3-butadiene-xylene condensation product, the condensation product having been prepared by heating 1,3-butadiene with xylene in the presence of sodium.

4. A copolymer of methyl methacrylate and a 1,3-butadiene-xylene condensation product, the condensation product having been prepared by heating 1,3-butadiene with xylene in the presence of sodium.

5. A copolymer of styrene and a 1,3-butadiene-xylene condensation product, the condensation product having been prepared by heating 1,3-butadiene with xylene in the presence of sodium.

6. A copolymer of maleic anhydride and a 1,3-butadiene-xylene condensation product, the condensation product having been prepared by heating 1,3-butadiene with xylene in the presence of sodium.

7. A copolymer of dicyclopentadiene and a 1,3-butadiene-xylene condensation product, the condensation product having been prepared by heating 1,3-butadiene with xylene in the presence of sodium.

8. A copolymer of butyl methacrylate and a 1,3-butadiene-xylene condensation product, the condensation product having been prepared by heating 1,3-butadiene with xylene in the presence of sodium.

DANIEL E. STRAIN.

REFERENCES CITED

The following references are of record in the file of this patent:

UNITED STATES PATENTS

| Number | Name | Date |
|---|---|---|
| 2,234,204 | Starkweather et al. | Mar. 11, 1941 |
| 2,279,293 | Clifford | Apr. 4, 1942 |

FOREIGN PATENTS

| Number | Country | Date |
|---|---|---|
| 333,872 | Great Britain | Aug. 15, 1930 |
| 114,023 | Australia | Oct. 9, 1941 |